C. SCHENCK.
LOCKING HUB STRUCTURE.
APPLICATION FILED AUG. 13, 1917.

1,298,797.

Patented Apr. 1, 1919.

Inventor
Charles Schenck
Samuel E. Darby
by his atty.

UNITED STATES PATENT OFFICE.

CHARLES SCHENCK, OF PHILADELPHIA, PENNSYLVANIA, ASSIGNOR TO BUDD WHEEL CORPORATION, OF PHILADELPHIA, PENNSYLVANIA, A CORPORATION OF PENNSYLVANIA.

LOCKING HUB STRUCTURE.

1,298,797.

Specification of Letters Patent. Patented Apr. 1, 1919.

Application filed August 13, 1917. Serial No. 185,997.

*To all whom it may concern:*

Be it known that I, CHARLES SCHENCK, a citizen of the United States, residing at Philadelphia, in the county of Philadelphia, State of Pennsylvania, have made a certain new and useful Invention in Locking-Hub Structure, of which the following is a specification.

This invention relates to locking hub structure.

The object of the invention is to provide a locking hub structure for wheels which is simple, economical to manufacture, and efficient in operation.

A further object of the invention is to provide a locking hub structure for wheels which permits the wheel to be readily detachable from its supporting hub and replaceable thereon, and when replaced upon its hub to be clamped and secured thereon.

A further object of the invention is to provide means for locking the detachable wheel upon its carrying hub, the locking means being released by the application of a spanner or other suitable tool to release the clamping nut.

Further objects of the invention will appear more fully hereinafter.

The invention consists substantially in the construction, combination, location, and relative arrangement of parts, all as will be more fully hereinafter set forth, as shown by the accompanying drawing, and finally pointed out in the appended claims.

Referring to the drawing:—

The same part is designated by the same reference numeral wherever it appears through the several views.

Figure 1:
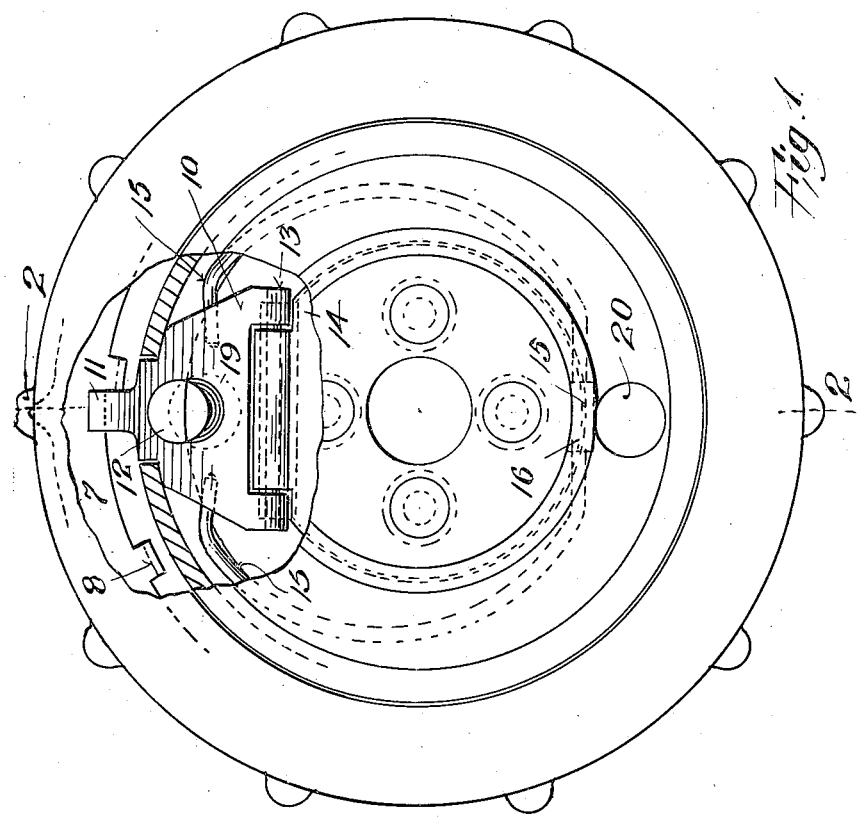
Figure 1 is a view in end elevation partly broken on the line 1, 1, Fig. 2, looking in the direction of the arrows.
Figure 2:
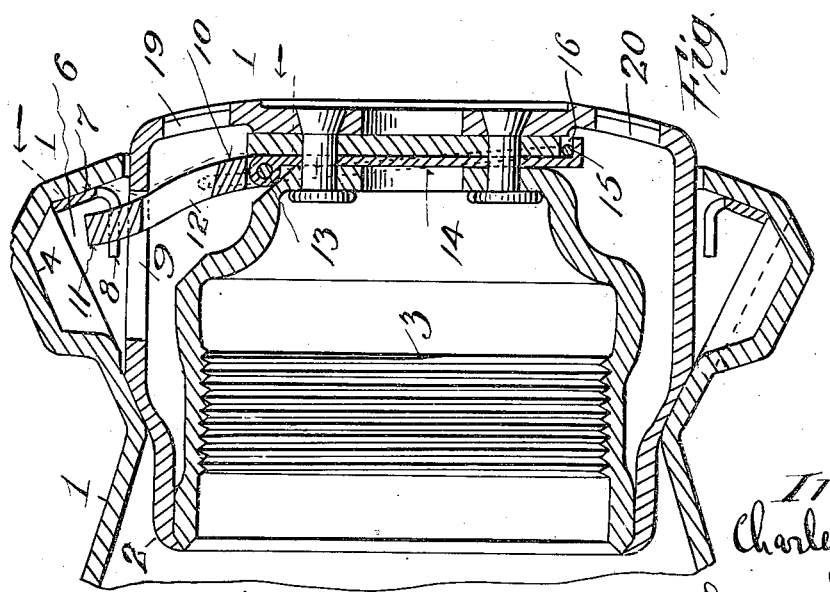
Fig. 2 is a sectional view taken on the line 2, 2, Fig. 1, looking in the direction of the arrows.

In structures of vehicle wheels such as are employed extensively in connection with motor vehicles, and particularly with wheels of the wire spoke type it is desirable to provide means by which the wheel may be readily detachable and removable from its hub and quickly and easily applied thereto, and securely clamped in place in such manner as to be locked in position when applied. It is also desirable to provide means to prevent the accidental disengagement or release of the locking means employed by reason of the backing off of the clamping nut usually employed in connection with locking devices, through jolts, shocks, or otherwise. It is also desirable to provide a hub structure for detachable or demountable wheels which is simple, economical to manufacture, and efficient in operation. It is among the special purposes of my present invention to provide a hub structure for detachable demountable wheels which secures the advantages and desirable characteristics referred to by means of the characteristic features of construction as will be more fully hereinafter set forth.

Referring to the drawing:—Reference numeral 1 designates the outer shell which forms a part of the wheel proper. The hub cap 2 which in the form shown is preferably made in two pieces of pressed steel suitably secured together is provided with interior threads 3 adapted to screw on coöperating threads of the hub shell not shown, but which is well known in the art. The outer shell 1 is flared outwardly at 4 to form a pocket 6 extending circumferentially around the hub cap 2 in which is located a stop plate 7 provided with teeth 8 which forms part of the locking mechanism. In the outer shell of the hub cap 2 is located a substantially square slot 9. A safety latch 10 of substantially plate shape and provided with a lug 11 at the top thereof, and a large hole 12 in the approximate center thereof, is located in said slot. The latch 10 is pivotally secured as at 13 to a plate 14 which is attached to the outer hub cap shell as shown. A spring 15 is secured to each side of the latch 10 and anchored in the hub cap at 16 as shown. To remove the hub cap a wrench or spanner provided with pins is employed, so that the pins thereof enter holes 19 and 20 of the hub cap and the pin which enters through hole 19 presses against the lower side of the hole 12 in the latch 10 causing the top of the latch to swing inwardly and down to a position flush with the outside of the hub shell thus permitting the hub cap to be unscrewed from the hub, as will be readily understood, inasmuch as the tooth or projecting lug 11 of the latch 10 is thereby removed from engagement with the teeth 8 of the stop plate 7. The springs 15 cause the latch to resume its normal position as soon as the wrench is removed. A big advantage is obtained by the use of this structure of hub cap in that the wrench is very easily inserted in the hole of the latch and requires a relatively small pressure to operate the same. Further, if one spring for the latch breaks the other spring is still operative to retain the latch in its locked position.

Having now set forth the objects and nature of my invention, and a structure embodying the characteristic features thereof, what I claim as new and useful and of my own invention, and desire to secure by Letters Patent, is,—

1. In a hub structure, the combination with an outer hub shell, of a cap provided with interior threads, and adapted to hold said outer shell in position, and provided with a substantially square slot through the peripheral wall thereof, a stop plate carried by said outer shell to extend circumferentially around said cap and positioned in the plane of the forward end of said slot, and having laterally extending teeth, a latch located within the interior of said cap and pivotally mounted and provided with a portion extending through said slot, and a pair of springs anchored in said cap and secured to said latch for normally maintaining the portion of said latch which projects through the slot in engaging relation with said stop plate.

2. In a hub structure, the combination with an outer shell, of a cap provided with interior threads, and adapted to hold said outer shell in position, and provided with a substantially square slot through the peripheral wall thereof, a stop plate carried by said outer shell to extend circumferentially around said cap and positioned in the plane of the forward end of said slot, and having laterally extending teeth, a latch located within said cap and pivotally mounted at one end therein and provided with a portion extending through said slot and a pair of springs anchored in said cap and secured to said latch for normally maintaining the portion of said latch which projects through the slot in engaging relation with said stop plate.

3. In a hub structure, the combination with an outer hub shell, of a cap provided with interior threads, and adapted to hold said outer shell in position, and provided with a substantially square slot through the wall surface thereof, a stop plate carried by said outer shell to extend circumferentially around said cap and positioned in the plane of the forward side of said slot, said plate having laterally extending teeth, a latch located and pivotally mounted within said cap and provided with a portion extending through said slot and a pair of springs anchored in said cap and secured to said latch for normally maintaining the portion of said latch which projects through the slot in engaging relation with said stop plate, and means for depressing said latch to rock the same about its pivot to release the projecting portion thereof from engagement with said stop plate.

4. In a hub structure, the combination with an outer hub shell, of a cap provided with interior threads, and adapted to hold said outer shell in position, and provided with a substantially square slot through the wall surface thereof, a stop plate carried by said outer shell to extend circumferentially around said cap and positioned in the plane of the forward side of said slot having laterally extending teeth, a latch located and pivotally mounted at one end within said cap positioned in a plane parallel to the end surface of said cap and provided with a portion extending through said slot, and a pair of springs encircling and anchored in said cap and secured to opposite edges of said latch for normally maintaining the portion of said latch which projects through the slot in engaging relation with said stop plate, and means for depressing said latch to rock the same about its pivot to release the projecting portion thereof from engagement with said stop plate.

5. In a hub cap structure, the combination with an outer shell, of a hub cap formed of two telescoping sleeves each bent at substantially right angles at their end to form a hub cap face, interior threads on the inner sleeve of said cap, said outer sleeve bearing against said outer shell, a plate located between said face portions of said cap, a latch pivotally carried by said plate and projecting through a slot in said outer sleeve into engaging relation with said outer shell, said outer sleeve also provided with a hole through the face portion thereof opposite said latch to accommodate means for rocking said latch about its pivot, and means for yieldingly maintaining said latch in its normal position.

6. The combination with an outer shell, flared radially to form a circumferential pocket, a stop plate carried by said shell in said pocket, and provided with projecting teeth, an exterior cap sleeve located within said shell formed with a flare to bear against said outer shell and provided with a longitudinal slot in the plane of the projecting teeth of said stop plate and bent at its end to form a cap face, an interior cap sleeve located within said exterior sleeve provided with interior threads, and bent at its end to form a face parallel with the face of said exterior sleeve, a plate located between the faces of said sleeves, means for securing said sleeves and said plate together, a latch pivotally carried by said plate to extend through said slot in said exterior sleeve to engage the teeth of said stop plate, the face of said exterior sleeve being provided with an opening to accommodate means for rocking said latch out of engaging relation to said stop plate.

In testimony whereof I have hereunto set my hand on this 7th day of August A. D., 1917.

CHARLES SCHENCK.